(12) United States Patent
Wunderlich

(10) Patent No.: US 11,373,517 B2
(45) Date of Patent: Jun. 28, 2022

(54) FIELD DEVICE COUPLING APPARATUS AND FIELD DEVICE

(71) Applicant: Festo SE & Co. KG, Esslingen (DE)

(72) Inventor: Steffen Wunderlich, Aichtal (DE)

(73) Assignee: FESTO SE & CO. KG, Esslingen (DE)

(*) Notice: Subject to any disclaimer, the term of this patent is extended or adjusted under 35 U.S.C. 154(b) by 0 days.

(21) Appl. No.: 17/064,114

(22) Filed: Oct. 6, 2020

(65) Prior Publication Data

US 2021/0104153 A1    Apr. 8, 2021

(30) Foreign Application Priority Data

Oct. 8, 2019  (DE) ..................... 10 2019 215 409.3

(51) Int. Cl.
*G08C 19/02*   (2006.01)
*F16K 31/02*   (2006.01)

(52) U.S. Cl.
CPC ............. *G08C 19/02* (2013.01); *F16K 31/02* (2013.01)

(58) Field of Classification Search
CPC ................................ G08C 19/02; F16K 31/02
See application file for complete search history.

(56) References Cited

U.S. PATENT DOCUMENTS

| 4,779,839 A * | 10/1988 | Sears ...................... E03B 7/071 251/129.04 |
| 6,504,489 B1 * | 1/2003 | Westfield ............... G08C 19/02 340/870.3 |
| 2007/0152645 A1 * | 7/2007 | Orth ....................... G08C 19/02 323/275 |

FOREIGN PATENT DOCUMENTS

| DE | 10297504 T5 | 11/2004 |
| DE | 102004004487 A1 | 8/2005 |
| DE | 102018201545 A1 | 8/2019 |
| WO | 2006127421 A2 | 11/2006 |
| WO | 2017025140 A1 | 2/2017 |

* cited by examiner

*Primary Examiner* — Nabil H Syed
*Assistant Examiner* — Cal J Eustaquio
(74) *Attorney, Agent, or Firm* — Hoffmann & Baron, LLP

(57) ABSTRACT

A field device coupling apparatus for coupling a field device to a higher-level controller, including a current interface with a first interface connection point and a second interface connection point, with which interface connection points the field device coupling apparatus can be connected to the higher-level controller in order to receive an interface current, further including a load circuit connected between the first interface connection point and the second interface connection point, the load circuit including a controllable load and being adapted to provide a supply voltage for the field device using the controllable load based on the interface current, wherein the load circuit includes an AC negative feedback path, which runs from an output branch of the load circuit to an input terminal of the controllable load and serves to increase the AC impedance between the first interface connection point and the second interface connection point.

11 Claims, 1 Drawing Sheet

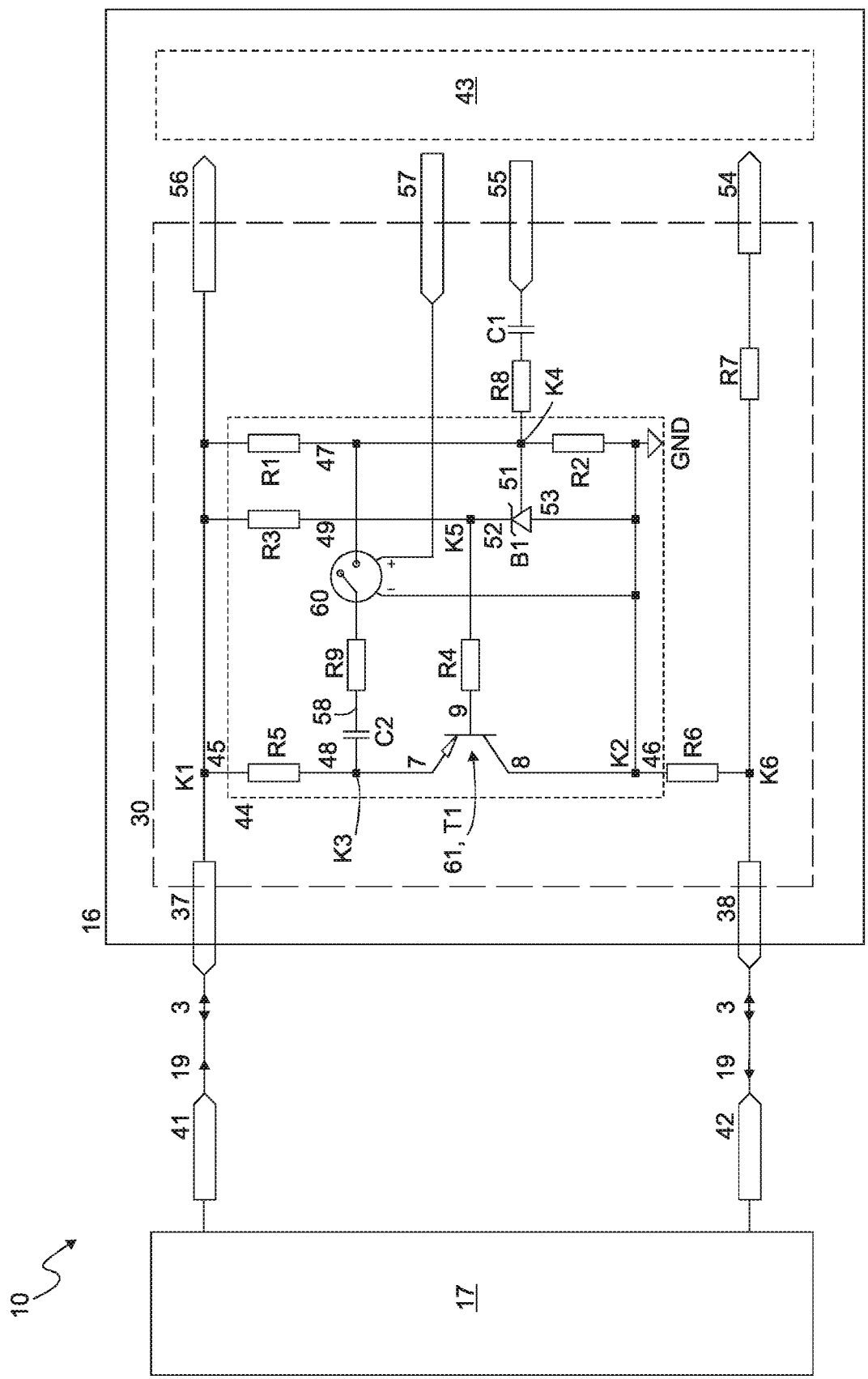

FIELD DEVICE COUPLING APPARATUS AND FIELD DEVICE

BACKGROUND OF THE INVENTION

The invention relates to a field device coupling apparatus for coupling a field device to a higher-level controller. The field device coupling apparatus comprises a current interface with a first interface connection point and a second interface connection point with which interface connection points the field device coupling apparatus can be connected to the higher-level controller in order to receive an interface current. The field device coupling apparatus further comprises a load circuit connected between the first interface connection point and the second interface connection point, the load circuit comprising a controllable load. The load circuit is adapted to provide, using the controllable load, a supply voltage for the field device based on the interface current.

The field device coupling apparatus expediently comprises a measuring resistor connected in series with the load circuit between the first interface connection point and the second interface connection point and which serves to receive a controller communication signal (transmitted via the interface current) from the higher-level controller.

WO/2017/025140 describes a field device coupling apparatus with a controllable load.

WO 2006/127421 A2 describes an apparatus for field devices to derive power from a communication loop signal.

DE 102 97 504 T5 describes a 4-20 mA current interface for connecting a valve positioner to a system.

There is a desire to draw a high amount of electrical power from the current interface for providing the supply voltage in order to be able to operate, with the supply voltage, energy-intensive consumers such as pilot valves and/or processors. For this purpose, the field device coupling apparatus should be designed so that a large load circuit voltage drops across the load circuit. A large load circuit voltage enables a large supply voltage to be provided. A large load circuit voltage can be achieved, for example, by reducing the measuring resistor.

Furthermore, there is the desire that the current interface has a certain minimum AC impedance between the interface connection points. Compliance with the minimum AC impedance may be required, for example, to ensure compatibility with a communication system, such as HART (Highway Addressable Remote Transducer). Typically, the minimum AC impedance is provided by the measuring resistor. However, this limits the ability to reduce the measuring resistor as mentioned above for the purpose of increasing the load circuit voltage, since the minimum AC impedance may not be achieved if the measuring resistor is reduced.

SUMMARY OF THE INVENTION

It is an object of the invention to modify the field device coupling apparatus mentioned above in such a way that a high load circuit voltage and a sufficiently large AC impedance can be achieved at the same time.

The object is solved by a field device coupling apparatus for coupling a field device to a higher-level controller, comprising a current interface with a first interface connection point and a second interface connection point, with which interface connection points the field device coupling apparatus can be connected to the higher-level controller in order to receive an interface current, further comprising a load circuit connected between the first interface connection point and the second interface connection point. The load circuit comprises an AC negative feedback path running from an output branch of the load circuit to an input terminal of the controllable load. The AC negative feedback path serves to increase the AC impedance between the first interface connection point and the second interface connection point.

In this way it can be achieved in particular that the required minimum AC impedance is provided by the load circuit. This makes it possible to reduce the measuring resistor (if present) and still meet the required minimum AC impedance.

The increase in the AC impedance of the load circuit is achieved by the AC negative feedback path running from the output branch to the input terminal of the controllable load. The AC feedback path causes negative feedback of AC signals from the output branch to the input terminal. As a result, the load circuit, especially the controllable load, is slowed down so that it cannot follow the AC signals, thus increasing the AC impedance of the load circuit. In particular, the AC impedance is increased compared to the case where the AC negative feedback path is not present or is interrupted.

The invention further relates to a field device comprising the field device coupling apparatus. The field device is adapted to provide the energy required for operation of the field device on the basis of the interface current using the field device coupling apparatus and to communicate with the higher-level controller via the interface current using the field device coupling apparatus.

BRIEF DESCRIPTION OF THE DRAWINGS

Exemplary details and embodiments are explained below with reference to the figure.

FIG. 1 shows a schematic illustration of a system consisting of a higher-level controller and a field device with a field device coupling apparatus.

DETAILED DESCRIPTION

FIG. 1 shows a system 10, which comprises a higher-level controller 17 and a field device 16 with a field device coupling apparatus 30. The higher-level controller 17 may also be referred to as superordinate controller. According to a preferred configuration, the system 10 also includes a valve (not shown in the figure) that is actuated by the field device 16. The system 10 is, for example, an industrial plant, especially a process technology plant.

The system 10 serves as an exemplary application environment for the field device coupling apparatus 30. The field device coupling apparatus 30 (or the field device 16) can also be provided on its own, i.e. in particular without the other components of the system 10.

The field device coupling apparatus 30 provides a current interface via which the field device 16 is connected to the higher-level controller 17 for communication. The current interface is preferably a 4-20 mA current interface. As an example, the current interface is an analog current interface. The circuit formed by the higher-level controller 17 and the current interface can also be called a current loop.

The higher-level controller 17 is adapted to transmit controller communication information, for example a control command, in particular a setpoint, to the field device 16 via the current interface. The field device 16 is preferably adapted to perform an action according to the controller communication information, for example, to actuate the valve.

The higher-level controller 17 is further adapted to supply the field device 16 with power via the current interface, in particular with the entire electrical energy available to the field device 16.

The field device 16 is adapted to transmit field device communication information to the higher-level controller 17 via the current interface, for example status information. The status information indicates for example a status of the field device 16 and/or the valve.

The higher-level controller 17 preferably belongs to the control level. For example, the higher-level controller 17 is designed as a programmable logic controller, PLC. The higher-level controller 17 comprises an own control housing and is preferably located spaced apart from the field device 16. The higher-level controller 17 comprises a first controller connection point 41 and a second controller connection point 42, with which the higher-level controller 17 is connected to the current interface. The higher-level controller 17 provides an interface current 19 which flows from the first controller connection point 41 to the second controller connection point 42.

The field device 16 is especially implemented in 2-wire technology, where the current interface represents the 2-wire connection. The field device 16 is especially adapted to provide the energy required for the operation of the field device 16 by means of the field device coupling apparatus 30 based on the interface current 19. The field device 16 is further adapted to communicate with the higher-level controller 17 via the interface current 19 using the field device coupling apparatus 30.

The field device 16 expediently includes a consumer 43, which is preferably fed by the electrical energy provided via the current interface. As mentioned above, the field device 16 is used in particular to operate a valve. The field device 16 is preferably designed as a positioner. In particular, the consumer 43 includes an electro-pneumatic converter to provide a pneumatic actuation signal to actuate the valve. As an example, the consumer 43 includes a pilot valve, in particular a solenoid valve. Further, the consumer 43 may include a field device control unit, in particular a processor, for example a microcontroller.

The field device 16 expediently comprises its own field device housing, in which, for example, the field device coupling apparatus 30 and/or the consumer 43, for example the electro-pneumatic converter and/or the field device control unit, are arranged. Expediently, the field device 16 is attached to the valve with its field device housing, for example by means of a mechanical interface arranged on the field device housing.

The higher-level controller 17 and the field device 16 are preferably connected to each other via electrical lines, for example one or more cables. For example, a first electrical line runs from the first control connection point 41 to a first interface connection point 37 of the field device 16 and a second electrical line runs from the second control connection point 42 to a second interface connection point 38 of the field device 16.

The higher-level controller 17 outputs at its first control connection point 41 the interface current 19, for example a 4-20 mA interface current, which is transmitted to the field device 16, passes through the field device 16 and finally flows back into the higher-level controller 17 via the second control connection point 42.

The communication between the higher-level controller 17 and the field device 16 preferably takes place via communication signals 3, which are impressed into the interface current 19 flowing through the current interface. The communication signals 3 are especially AC components of the interface current 19. The communication signals 3 are preferably higher frequency than 50 Hz or 60 Hz, especially higher frequency than 1 kHz. For example, the frequency of the communication signals is 2 kHz. The communication signals 3 preferably comprise a controller communication signal which is transmitted from the higher-level controller 17 to the field device 16 and/or a field device communication signal which is transmitted from the field device 16 to the higher-level controller 17.

The communication between the higher-level controller 17 and the field device 16 is carried out in particular according to the HART communication system (Highway Addressable Remote Transducer). The communication signals 3 are preferably HART communication signals. Expediently, the current interface meets the requirements of the HART specification, e.g. HCF_SPEC-54.

The field device coupling apparatus 30 comprises the first interface connection point 37 and the second interface connection point 38, with which the field device coupling apparatus 30 can be connected to the higher-level controller 17 to receive the interface current 19. The AC impedance between the first interface connection point 37 and the second interface connection point 38 is at least 230 Ohms, especially in a frequency range of 500 Hz to 10 kHz.

The field device coupling apparatus 30 comprises a load circuit 44 connected between the first interface connection point 37 and the second interface connection point 38. The load circuit 44 comprises a controllable load B1 and is adapted to provide the supply voltage for the field device 16 using the controllable load B1. The load circuit 44 provides the supply voltage based on the interface current 19. In particular, the load circuit 44 generates the supply voltage from the interface current 19. Expediently, the load circuit 44 is adapted to closed-loop control (or regulate) the supply voltage to a predetermined voltage value, in particular a constant voltage value, using the controllable load B1.

The load circuit 44 includes a first load circuit connection point 45 and a second load circuit connection point 46, with which load circuit connection points 45, 46 the load circuit 44 is connected between the interface connection points 37, 38. The interface current 19 flows through the load circuit from the first load circuit connection point 45 to the second load circuit connection point 46.

The load circuit 44 further includes a supply terminal 56 for providing the supply voltage for the field device 16. A processing unit (not shown in the figure) for processing the supply voltage, for example a filter, in particular a low-pass filter, can be connected between the supply terminal 56 and the consumer 43. Expediently, the supply voltage passes through this processing unit before the supply voltage is fed to the consumer 43. The first load circuit connection point 45, the supply terminal 56 and the first interface connection point 37 are exemplarily directly connected to a first circuit node K1. The first load circuit connection point 45, the supply terminal 56 and the first interface connection point 37 are exemplarily connected to the same potential—the potential of the first circuit node K1.

A load circuit voltage drops across the load circuit 44—that is, from the first load circuit connection point 45 to the second load circuit connection point 46. The load circuit voltage is caused by the interface current 19. The load circuit 44 provides the supply voltage based on this load circuit voltage. The load circuit 44 is adapted to closed-loop control (or regulate) the load circuit voltage to a predetermined voltage value, in particular a constant voltage value, using the controllable load B1.

The second load circuit connection point 46 is exemplary on a reference potential, expediently on the ground potential. Expediently, the second load circuit connection point 46 is connected (especially directly) to a ground connection GND. The second load circuit connection point 46 is directly connected to a second circuit node K2 and is at the potential of the second circuit node K2.

The load circuit B1 comprises a first output branch 48. At least a part of the interface current 19 flows through the first output branch 48. The current flowing through the first output branch 48 shall also be called first load circuit current. The first load circuit current is set by the control of the load B1. The first load circuit current thus depends on how the load B1 is controlled. The first output branch 48 runs from the first load circuit connection point 45 to the second load circuit connection point 46. The first output branch 48 includes, for example, a fifth resistor R5 and a transistor T1, which are connected in series. The first output branch 48 comprises a third circuit node K3, which is exemplarily arranged between the transistor T1 and the fifth resistor R5. The third circuit node K3 can also be called the first output node.

The transistor T1 has a first current carrying terminal 7, a second current carrying terminal 8 and a control terminal 9 The first current carrying terminal 7 is exemplarily connected to the fifth resistor R5. The second current carrying terminal 8 is connected to the second load circuit connection point 46 as an example. The control terminal 9 is connected (e.g. via a fourth resistor R4) to a fifth circuit node K5 (which can also be called second output node).

Expediently, the transistor T1 is a bipolar transistor, especially a PNP transistor. As an example, the first current carrying terminal 7 is an emitter terminal, the second current carrying terminal 8 is a collector terminal and the control terminal 9 is a base terminal.

The load circuit 44 further includes an input branch 47. The input branch 47 is expediently connected in parallel to the first output branch 48. The input branch 47 runs exemplarily from the first load circuit connection point 45 to the second load circuit connection point 46. The current flowing through the input branch 47 is also called third load circuit current. The input branch 47 is connected to the input terminal 51 of the load B1. The input branch 47 is used to control the load B1, which control sets the current in the first output branch 48. The input branch 47 comprises a voltage divider, which is exemplarily formed by a first resistor R1 and a second resistor R2 connected in series to the first resistor R1. The voltage divider provides a partial voltage based on the load circuit voltage dropping across the load circuit 44. As an example, the voltage divider provides the partial voltage at a fourth circuit node K4. The fourth circuit node K4 can also be called input node. The input terminal 51 is connected to the fourth circuit node K4.

The load circuit 44 further includes a second output branch 49, which is connected in parallel to the first output branch 48 and/or in parallel to the input branch 47. The current flowing through the second output branch 49 shall also be called the second load circuit current. The second load circuit current is set by the control of the load B1. The second load circuit current thus depends on how the load B1 is controlled. The second output branch 49 runs from the first load circuit connection point 45 to the second load circuit connection point 46. The second output branch 49 includes, as an example, a third resistor R3 and the controllable load B1, which are connected in series with each other. The third resistor R3 is used to set the operating point of the load B1.

The second output branch 49 comprises the fifth circuit node K5, which is located between the controllable load B1 and the third resistor R3.

The controllable load B1 comprises a load input terminal 51, a first load output terminal 52 and a second load output terminal 53. The first load output terminal 52 can also be called cathode and the second load output terminal 53 can also be called anode. The load input terminal 51 can also be referred to as the reference terminal. The load input terminal 51 is connected to the input branch 47, in particular to the fourth circuit node K4. Expediently, the partial voltage provided by the voltage divider is fed to the load input terminal 51. The first load output terminal 52 is connected to the control terminal 9 of the transistor T1, exemplarily via a fourth resistor R4. The second load output terminal 53 is connected to the second load circuit connection point 46.

The controllable load B1 is adapted to set the current flowing from the first load output terminal 52 to the second load output terminal 53 (i.e. the second load circuit current) on the basis of the voltage applied to the load input terminal 51—exemplarily the partial voltage provided by the voltage divider. In particular, the controllable load B1 is adapted to compare the voltage applied to the load input terminal 51 with a reference voltage, e.g. an internal reference voltage, and to set the second load circuit current on the basis of the comparison. The reference voltage is 2.5V, as an example. For example, the controllable load B1 is adapted to increase the second load circuit current in response to the voltage applied to the load input terminal 51 being higher than the reference voltage. Further, the controllable load B1 is expediently adapted to reduce the second load circuit current in response to the voltage at the load input terminal 51 being less than the reference voltage. In particular, by means of the controllable load B1 the load circuit voltage is closed-loop controlled (or regulated) to a voltage value that results from the reference voltage and the divider ratio of the voltage divider. For example, the load circuit voltage is closed-loop controlled (or regulated) to a voltage value which is equal to the product of the reference voltage and the inverse divider ratio of the voltage divider.

Preferably, for the load B1, the current/voltage characteristic between the first and second load output terminals 52, 53 is changed via a control of the input terminal 51. For example, the load B1 is a shunt voltage closed-loop controller or a shunt voltage regulator. For example, the load B1 can be the component Zetex ZHT431 from the company Diodes Incorporated or can be a component that has the same function as this component, for example the component "TL431". For example, the load B1 is designed as an "Adjustable Precision Zener Shunt Regulator". The load B1 can also be called an adjustable Zener diode.

The load B1 preferably has a very low impedance, especially for AC voltages, which is advantageous for closed-loop voltage control.

The load circuit 44 exemplarily includes a current amplifier 61. Expediently, the current amplifier 61 is formed by the transistor T1. The current amplifier 61 sets the first load circuit current flowing through the first output branch 48. Expediently, the current amplifier 61 is controlled by the load B1 and is in particular connected to the first load output terminal 52. As an example, the current amplifier 61 sets the first load circuit current depending on the voltage applied to the first load output terminal 52. The voltage applied to the first load output terminal 52 is in turn dependent on the voltage applied to the first load input terminal 51, for example, the partial voltage provided by the input branch 47.

During operation, the voltage divider formed by the resistors R1, R2 in connection with the load B1 determines the load circuit voltage, which is set by regulation or closed-loop control via the transistor T1 and the fifth resistor R5. The fourth resistor R4 limits the maximum current through the cathode of the load B1 and through the base terminal of the transistor T1 (in connection with its current amplification factor).

As mentioned at the beginning, the load circuit 44 should provide a sufficiently high AC impedance—in particular a sufficiently high AC resistance. The load circuit 44 comprises an AC negative feedback path 58, which runs from the first output branch 48, exemplarily the third circuit node K3, to the input terminal 51 of the controllable load B1. The AC negative feedback path 58 serves in particular to increase the AC impedance between the first interface connection point 37 and the second interface connection point 38. The AC negative feedback path 58 runs exemplarily to the input branch 47, in particular to the fourth circuit node K4.

Expediently, the AC negative feedback path 58 includes a high-pass filter. As an example, the AC feedback path 58 includes a capacitor, hereinafter referred to as "second capacitor C2". In addition, the AC feedback path 58 includes a resistor, hereinafter referred to as the "ninth resistor R9", which is expediently connected in series with the second capacitor C2. The second capacitor C2 can also be referred to as a negative feedback capacitor. The ninth resistor R9 can also be called a negative feedback resistor.

The AC negative feedback path 58 runs from the third circuit node K3 back to the input terminal 51, via which the potential of the third circuit node K3 is set. The coupling between the input terminal 51 and the circuit node K3 via the load B1 is exemplary such that an increase of the potential at the input terminal 51 leads to a decrease of the potential at the third circuit node K3 and a decrease of the potential at the input terminal 51 leads to an increase of the potential at the third circuit node K3. Via the AC negative feedback path 58, the potential change occurring at the third circuit node, which is opposite to the potential change present at the input terminal 51, is fed back to input terminal 51 in order to counteract the potential change at the input terminal 51. A negative feedback loop is present, which runs from the input terminal 51 via the load B1 (and optionally the current amplifier T1) to the third circuit node K3 and from there via the AC feedback path 58 back to the input terminal 51.

As an example, a part of the output signal (e.g., a part of the load circuit voltage) of the load circuit 44 is tapped via the fifth resistor R5. This output signal is fed via the AC negative feedback path 58 with the second capacitor C2 and the ninth resistor R9 to the input terminal of the load B1, depending on the frequency. This negative feedback slows down load B1 in such a way that it can no longer follow a "fast" signal on the current interface, thus increasing the AC impedance across the first interface connection point 37 and the second interface connection point 38.

Expediently, only AC components are transmitted via the AC negative feedback path 58—i.e. in particular no DC components are transmitted via the AC negative feedback path 58.

The AC negative feedback path 58 is exemplarily present in addition to one or more further negative feedback paths, e.g. DC negative feedback paths, of the load circuit 44. For example, a first DC negative feedback path runs from the third circuit node K3 via the first circuit node K1 to the input terminal 51—exemplarily via the two resistors R5 and R1.

Furthermore, a second DC negative feedback path runs from the fifth circuit node K5 via the first circuit node to the input terminal 51 (exemplarily via the two resistors R3 and R1).

Preferably, the load circuit 44 does not include any inductance, especially no inductance to increase the AC impedance.

The field device coupling apparatus 30 is preferably adapted to superimpose the field device communication signal on the interface current 19 in order to transmit the field device communication information contained in the field device communication signal to the higher-level controller 17. As an example, the field device coupling apparatus 30 is adapted to control the controllable load B1 via the input terminal 51 according to the field device communication information in order to superimpose the field device communication signal 3 on the interface current 19.

The control of the input terminal 51 according to the field device communication information is carried out, for example, by coupling a control signal containing the field device communication information into the input terminal 51, for example via a coupling path which comprises a first capacitor C1 and is connected to the input terminal 51, in particular directly to the fourth circuit node K4. The input path exemplarily further includes an eighth resistor R8, which is connected in series with the first capacitor C1. The input path leads from a transmit terminal 55 to the input terminal 51. The transmit terminal 55 is connected to a transmit unit, which can be part of the consumer 43, for example, and which generates the control signal. The transmit unit includes, for example, a HART transmit unit.

The field device coupling apparatus 30 may further include a switching device 60, which is adapted to disable the AC negative feedback path 58 to reduce the AC impedance between the first interface connection point 37 and the second interface connection point 38. The switching device 60 is further adapted to activate the AC feedback path 58 to increase the AC impedance between the first interface connection point 37 and the second interface connection point 38. Expediently, the switching device 60 is adapted to selectively activate or deactivate the AC negative feedback path 58.

The switching device 60 comprises a switch, which is arranged in the AC negative feedback path 58 and is exemplarily connected in series to the second capacitor C2 and/or the ninth resistor R9. By opening the switch, the AC feedback path is interrupted and thus deactivated. By closing the switch, the AC feedback path is established and thus activated.

The switching device 60 is exemplarily controlled via a switching terminal 57. The switching terminal 57 may preferably be connected to the consumer 43, in particular the field device control unit. Expediently, the switching device 60 is controlled by the field device control unit.

The field device 16 is expediently adapted to selectively assume a transmit mode or a receive mode. Preferably, the field device 16 is adapted to interrupt the AC negative feedback path in the transmit mode, in particular by means of the switching device 60. Expediently, the field device 16 is adapted to superimpose the interface current 19 with the field device communication signal in the transmit mode, in particular in the manner described above, in order to transmit the field device communication signal to the higher-level controller 17. Furthermore, the field device 16 is adapted to establish the AC negative feedback path in the receive mode, in particular by means of the switching device 60. Expediently, the field device 16 is adapted to receive the controller communication signal in the receive mode. Preferably, the field device is adapted to switch from the transmit mode to the receive mode and/or to switch from the receive mode to the transmit mode.

The field device coupling apparatus 30 is expediently able to change its AC impedance through the switching device 60, especially without influencing the DC shunt voltage (i.e., for example, the DC load circuit voltage dropping across the load circuit 44). Thus, it is possible to temporarily change to a lower impedance state of the same arrangement. In this way, for example, a HART transmission signal (e.g. the field device communication signal) can be modulated onto the 2-wire line, especially onto the interface current 19. In the receive mode, the load circuit 44 is set to receive and is high-impedance (with respect to AC signals). In the transmit mode, the load circuit 44 is low impedance (with respect to AC signals) and is adapted as a HART transmitter, for example In both modes, the specification HCF_SPEC-54 is expediently fulfilled.

In the transmit mode, when the AC negative feedback path is disabled, the AC impedance is reduced so that the field device communication signal (such as a HART transmit signal) is coupled into the current loop at low impedance. The field device communication signal is coupled into the current loop as a voltage change with the voltage gain V=-(R1/R8). The capacitor C1 is used for DC decoupling of the field device communication signal or the control signal. The field device communication signal can also be called modulation signal.

The controller communication signal transmitted from the controller 17 to the field device 16 expediently includes a first controller communication signal and a second controller communication signal. The first controller communication signal is expediently mapped to the DC current value of the interface current 19 and contains, for example, a setpoint as controller communication information. The second controller communication signal is expediently transmitted via an AC component of the interface current 19 and is, for example, a HART signal, especially a HART receive signal.

The field device 16 is expediently adapted to receive the controller communication signal, especially the first controller communication signal and/or the second controller communication signal by means of the measuring resistor R6. For example, the setpoint and/or the HART receive signal are obtained from the current loop via the measuring resistor R6. The measuring resistor R6 can also be called the sixth resistor. The measuring resistor R6 is preferably smaller than 230 Ohm.

The measuring resistor R6 is connected between the first interface connection point 37 and the second interface connection point 38, in series to the load circuit 44. As an example, the measuring resistor R6 is connected between the second circuit node K2 and a sixth circuit node K6. The sixth circuit node is connected to the second interface connection point 38 and (expediently via the seventh resistor R7) to a receive terminal 54. The receive terminal 54 is connected to the consumer 43, especially the field device control unit.

The voltage dropping from the first interface connection point 37 to the second interface connection point 38 is divided into the load circuit voltage and a measurement voltage dropping across the measuring resistor R6. The field device 16 is adapted to receive the controller communication signal via the receive terminal 54, in particular by detecting the measuring voltage dropping across the measuring resistor R6.

For example, the field device 16 is adapted to amplify the voltage dropping across the measuring resistor R6 with an amplifier (not shown in the figure), especially an instrumentation amplifier, and to feed it to a modem (not shown in the figure), especially a HART modem. The modem carries out a demodulation of the controller communication signal contained in the measuring voltage. The amplifier and/or the modem are preferably part of consumer 43.

It should be noted that the terms "first", "second", "third", etc. are only used to give the respective components a unique designation. These terms are not intended to imply how many components are present. For example, the term "ninth resistor" does not imply that there are nine resistors.

What is claimed is:

1. A field device coupling apparatus for coupling a field device to a higher-level controller, comprising a current interface with a first interface connection point and a second interface connection point, with which interface connection points the field device coupling apparatus can be connected to the higher-level controller in order to receive an interface current, further comprising a load circuit connected between the first interface connection point and the second interface connection point, the load circuit comprising a controllable load and being adapted to provide, based on the interface current, a supply voltage for the field device using the controllable load, wherein the load circuit comprises an AC negative feedback path, which runs from an output branch of the load circuit to an input terminal of the controllable load and serves to increase an AC impedance between the first interface connection point and the second interface connection point, and wherein the field device coupling apparatus further comprises a switching device adapted to disable the AC negative feedback path to reduce the AC impedance between the first interface connection point and the second interface connection point.

2. The field device coupling apparatus according to claim 1, wherein the first output branch carries a first load circuit current which is set via control of the input terminal.

3. The field device coupling apparatus according to claim 1, wherein the AC negative feedback path comprises a high-pass filter.

4. The field device coupling apparatus according to claim 1, wherein the AC negative feedback path comprises a capacitor and a resistor connected in series with the capacitor.

5. The field device coupling apparatus according to claim 1, wherein the field device coupling apparatus is adapted to control the controllable load via the input terminal in accordance with field device communication information in order to superimpose a field device communication signal on the interface current and thus transmit the field device communication information to the higher-level controller by means of the field device communication signal.

6. The field device coupling apparatus according to claim 1, further comprising a measuring resistor which is connected between the first interface connection point and the second interface connection point in series with the load circuit, wherein the field device coupling apparatus is adapted to receive, using the measuring resistor, a controller communication signal transmitted via the interface current from the higher-level controller.

7. The field device coupling apparatus according to claim 1, the load circuit further comprising a current amplifier which is controlled by the load and which sets, according to this control, the first load current flowing through the first output branch.

8. The field device coupling apparatus according to claim 1, wherein the load circuit comprises an input branch connected in parallel to the first output branch, to which input branch the input terminal of the controllable load is connected, and wherein the AC negative feedback path runs from the first output branch to the input branch.

9. The field device coupling apparatus according to claim 8, wherein the input branch comprises a voltage divider which provides, based on a load circuit voltage across the load circuit, a partial voltage which is supplied to the input terminal.

10. A field device, comprising a field device coupling apparatus for coupling a field device to a higher-level controller, the field device coupling apparatus comprising a current interface with a first interface connection point and a second interface connection point, with which interface connection points the field device coupling apparatus can be connected to the higher-level controller in order to receive an interface current, the field device coupling apparatus further comprising a load circuit connected between the first interface connection point and the second interface connection point, the load circuit comprising a controllable load and being adapted to provide, based on the interface current, a supply voltage for the field device using the controllable load, wherein the load circuit comprises an AC negative feedback path, which runs from an output branch of the load circuit to an input terminal of the controllable load and serves to increase an AC impedance between the first interface connection point and the second interface connection point, wherein the field device is adapted to provide the energy required for operating the field device by means of the field device coupling apparatus on the basis of the interface current and to communicate with the higher-level controller by means of the field device coupling apparatus via the interface current, and wherein the field device coupling apparatus further comprises a switching device adapted to disable the AC negative feedback path to reduce the AC impedance between the first interface connection point and the second interface connection point.

11. The field device according to claim 10, wherein the field device is adapted to actuate a valve.

* * * * *